Nov. 19, 1968    J. F. DE LORD ET AL    3,412,282
CATHODE RAY TUBE EMPLOYING ELECTRON MIRROR
Filed Nov. 9, 1964

JEAN F. DeLORD
ROBERT W. NELSON
INVENTORS.

BY BUCKHORN, BLORE, KLARQUIST & SPARKMAN
ATTORNEYS

United States Patent Office 3,412,282
Patented Nov. 19, 1968

3,412,282
CATHODE RAY TUBE EMPLOYING ELECTRON MIRROR
Jean F. De Lord, Portland, Oreg., and Robert W. Nelson, Vancouver, Wash., assignors to Tektronix, Inc., Beaverton, Oreg., a corporation of Oregon
Filed Nov. 9, 1964, Ser. No. 409,789
8 Claims. (Cl. 315—30)

ABSTRACT OF THE DISCLOSURE

A cathode ray tube is described in which a magnifying electron mirror structure is employed to magnify and reflect electron images onto a fluorescent screen, such electron images being formed before transmission through such mirror structure in any suitable manner, such as by deflection modulation of an electron beam within such tube.

---

The subject matter of the present invention relates generally to cathode ray tubes, and in particular to a cathode ray tube which employs an electron mirror structure within the envelope of the tube to magnify and reflect an electron image onto its fluorescent screen to shorten the length of such tube. The electron image is formed by deflecting a beam of electrons within the tube in accordance with an electrical signal, and the beam is directed into the mirror structure in a direction away from the fluorescent screen, decelerated within such mirror structure and then reversed in a general direction before such beam is projected out of the mirror structure onto the screen.

The cathode ray tube of the present invention is especially useful when employed as the display device of a cathode ray oscilloscope. Electron mirrors have previously been employed in electron microscopes such as that described by Ludwig Mayer in the article entitled, "On Electron Mirror Microscopy," which was published October 1955 in the Journal of Applied Physics, volume 26, number 10, pages 1228 to 1230. A specimen within the microscope is mounted on the backplate or mirror electrode within the electron mirror structure so that an electrostatic charge produced on such specimen forms a potential gradient which deflects the electron beam to produce an electron image on a fluorescent screen. The electron image depicts the electrical properties as well as the shape of the surface of such specimen. Of course, the electron microscope could not be used as a cathode ray tube to reproduce the waveform images of electrical signals because such microscope contains no horizontal and vertical deflection plates, and the nonuniform charge on the specimen would prevent the formation of such image. In addition, television receiver tubes have previously been produced which bend the electron beam within such tubes back towards the source of the beam before directing such beam onto the fluorescent screen of the tube in order to enable such tube to have a flat envelope of short length. However, these television tubes do not employ an electron mirror to reflect a Gaussian electro-optical image in a manner similar to that of the electron microscope.

The electron mirror in the present cathode ray tube also acts as a convex lens to magnify the electron image and project the electron image in focus on the fluorescent screen in addition to reflecting such image. This enables the electron beam to be deflected through smaller angles while forming an image of similar size to that of a conventional tube. As a result, the deflection sensitivity of the present tube is greater than that of previous cathode ray tubes. The deflection plates within the tube of the present invention may be positioned farther apart and provided with a shorter length to decrease the plate capacitance and increase the high frequency response of the tube.

It is therefore one object of the present invention to provide an improved cathode ray tube of shorter length and greater deflection sensitivity.

Another object of the present invention is to provide an improved cathode ray tube in which an electron mirror is employed to magnify and reflect the electron image formed by deflecting an electron beam in such tube in accordance with an electrical signal.

A further object of the present invention is to provide an improved cathode ray tube of high frequency response.

An additional object of the invention is to provide an improved electron mirror structure for use in a cathode ray tube, of a simple and inexpensive construction.

Still another object of the invention is to provide an improved electron mirror for use in the cathode ray tube in which a pair of apertured electrodes are employed along with an unapertured backplate electrode in order to change the magnification of the image reflected by such electron mirror by changing only the potential of the backplate electrode.

Other objects and advantages of the present invention will be apparent from the following detailed description of certain preferred embodiments thereof and from the attached drawings of which:

Figure 1:
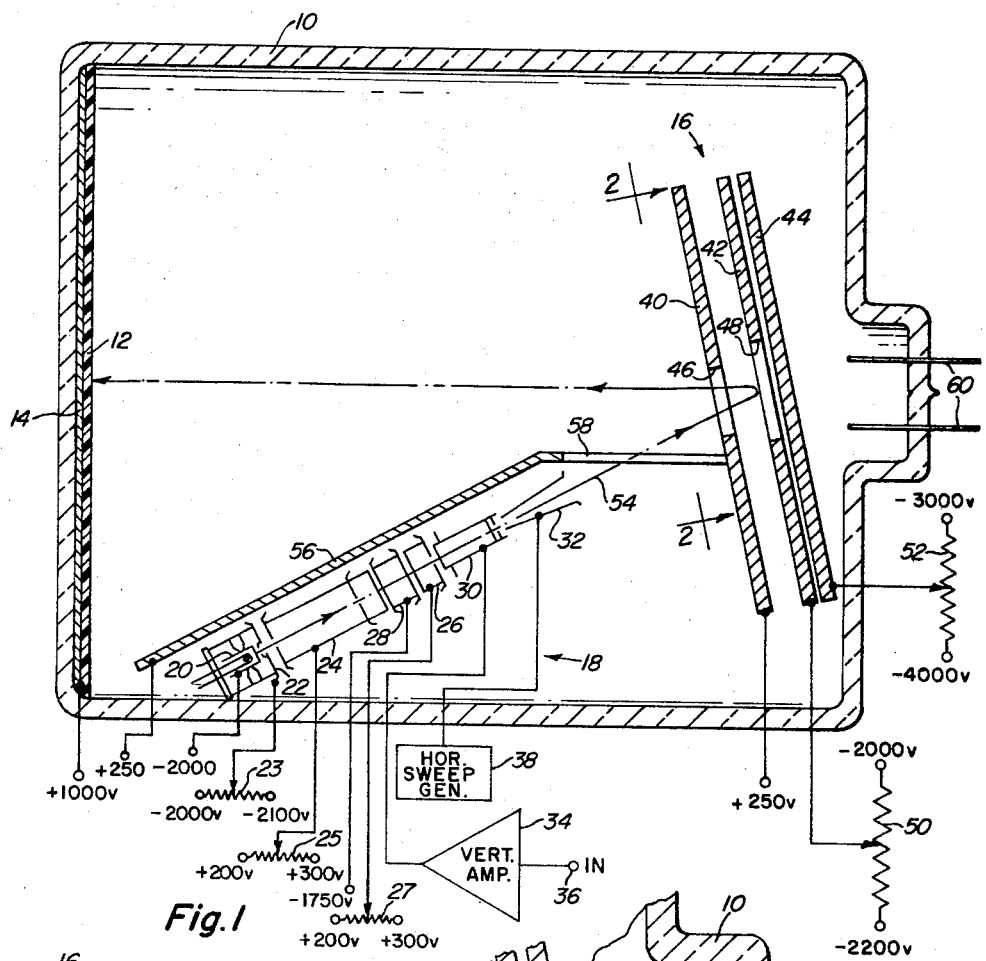
FIG. 1 is a schematic view of one embodiment of a cathode ray tube made in accordance with the present invention along with associated circuitry.

One embodiment of the cathode ray tube of the present invention is shown in FIG. 1 and includes an evacuated envelope 10 of glass or other suitable insulating material of generally cylindrical configuration having a diameter of about 5 inches and a length of approximately 6 inches. A layer of phosphor material 12 is coated over the transparent faceplate portion of the envelope to provide a fluorescent screen at one end of the tube. It may also be desirable to provide a light transparent conductive coating 14 of tin oxide or other suitable material between the fluorescent screen 12 and the faceplate to accelerate the electrons of the electron beam produced within the tube before such beam strikes the screen in order to increase the brightness of the light image produced by such beam on the fluorescent screen. An electron mirror structure 16 is supported inside the opposite end of the envelope from the fluorescent screen. Between the fluorescent screen 12 and the electron mirror 16 is positioned an electron gun 18 which is directed away from the fluorescent screen and toward the electron mirror. The electron gun 18 includes a cathode 20 connected to a negative D.C. potential of $-2,000$ volts and a control grid 22 connected to the movable contact of a potentiometer 23 having its end terminals connected to negative D.C. voltage sources of $-2,000$ volts and $-2,100$ volts to apply a more negative D.C. potential to such grid. The electron gun also includes a first anode 24 and a second anode 26 which are connected to the movable contacts of separate potentiometers 25 and 27, connected between sources of positive D.C. potentials of $+200$ and about $+300$ volts to enable better focusing, as well as a focusing electrode 28 positioned between such anodes and connected to a variable negative D.C. potential of about $-1,750$ volts.

Between the electron gun 18 and the electron mirror 16 is positioned a pair of vertical deflection plates 30 and a pair of horizontal deflection plates 32. The vertical deflection plates 30 are connected to the output of a vertical amplifier 34 whose input is connected to an input terminal 36 to which the input signal is applied whose waveform is to be displayed upon the fluorescent screen 12. The horizontal deflection plates 32 are connected to a horizontal sweep generator 38 which applies a ramp shaped sweep signal of known frequency to such horizontal deflection plates. It should be noted that the horizontal sweep generator 38 may be triggered by the vertical input signal in which case a delay line (not shown) would be provided between the input terminal 36 and the vertical amplifier 34.

Figure 2:
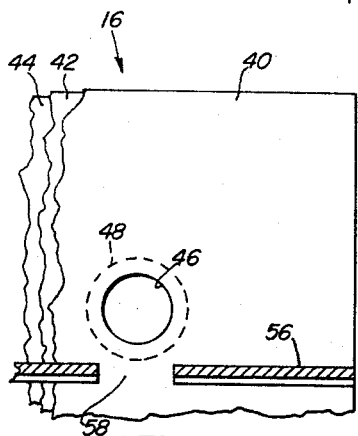
FIG. 2 is a partial section view along the line 2—2 of FIG. 1 showing a portion of the electron mirror employed in such tube.

One embodiment of the electron mirror 16 is formed by three flat parallel electrodes including a first lens electrode 40, a second lens electrode 42 and a backplate electrode 44 of stainless steel or other homogeneous, nonmagnetic, electrical conducting material. As shown in FIG. 2, the first lens electrode 40 is provided with a circular aperture 46 therethrough which may have a diameter of about ½ inch, while the second lens electrode 42 is also provided with a circular aperture 43 of about ¾ inch in diameter in axial alignment with the aperture 46, and the lens electrodes may be separated by a distance of ¼ inch. The diameter of the aperture 48 in the second lens electrode is greater than that of aperture 48 in the second lens electrode to provide the proper electrical field. The backplate electrode 44 is an unapertured metal plate which may be spaced from the rear surface of the second lens electrode 42 by a distance of about $\frac{1}{16}$ inch. The first lens electrode 40 is connected to a positive D.C. potential of +250 volts, and the second lens electrode 42 is connected to the movable contact of a potentiometer 50 whose end terminals are connected between negative D.C. potentials of —2,000 and —2,200 volts, respectively, or to some other source of variable negative D.C. potential in order to vary the voltage applied to such second lens electrode. The backplate electrode 44 is connected to the movable contact of a potentiometer 52 whose end terminals are connected between negative D.C. voltage sources of —3,000 volts and —4,000 volts, respectively, so that such backplate electrode is always very much negative with respect to the potential of the cathode 20. This causes the electron beam 54 emitted from the electron gun 18 and directed into the electron mirror to be decelerated within the mirror structure so that such beam reverses its general direction of travel in the vicinity of aperture 48 after it is transmitted through the aperture 46 and is directed back out of the electron mirror through the same aperture it entered and then onto the fluorescent screen 12. Thus, in the embodiment of FIG. 1, the second lens electrode 42 acts as a mirror electrode as well.

A shield plate 56 of metal is provided to separate the electron gun 18 from the space between the electron mirror 16 and the phosphor screen 12 through which the electron beam 54 passes after it is reflected by the mirror. This shield plate prevents the electrostatic fields of the electron gun and the deflection plates 30 and 32 from changing the path of the electron beam so that such beam travels in a substantially straight line from the mirror to the flourescent screen. The shield plate 56 may be provided with a rectangular slot 58 at one end through which the electron beam 54 passes on its way toward the electron mirror, such slot being sufficiently wide and long to enable horizontal and vertical deflection of the electron beam. It should be noted that the envelope 10 may be provided with a plurality of metal pins 60 extending through the rear end or side thereof which function as leads to connect the electrodes of the electron gun, and the electron mirror to sources of D.C. potential outside the envelope.

The electron image formed by deflecting the electron beam with the signals applied to the horizontal and vertical deflection plates 32 and 30, is transmitted into the electron mirror structure 16 which magnifies the image and electrically reflects it onto the fluorescent screen 12 without distorting such image. Thus, the electron mirror structure 16 of the present invention may operate in the manner of a convex lens to magnify the Gaussian electrooptical image of the input signal waveform by a factor on the order of ten, as well as in the manner of a mirror to electrically reflect such image. This is entirely different from the operation of the electron mirror employed in electron microscopes such as that shown in the article by Ludwig Mayer referred to previously, or the electron mirror used in the apparatus for reading out magnetic or electrostatic data stored on the backplate of the mirror shown in U.S. Patent 3,124,790 to J. D. Kuehler which was issued Mar. 10, 1964. It should be noted that a "zoom" lens effect for magnifying and demagnifying the electron image is achieved in the electron mirror of the present invention due to the presence of the aperture 48 in second lens electrode 42 merely by moving the movable contact of potentiometer 52 to change the D.C. voltage applied to the mirror electrode 44. By varying the D.C. potential of the mirror electrode 44, the focal length of the lens formed by the electron mirror structure is changed to provide a concave or convex lens effect.

The image magnification by the electron mirror enables the diameter of the electron beam transmitted through the deflection plates 30 and 32 to be quite small since the diameter of the beam projected onto the fluorescent screen 12 by such electron beam is increased by the magnification. In addition, this magnification of the electron image also enables the electron beam to be deflected through smaller angles. As a result, the deflection sensitivity of the present cathode ray tube is increased. This enables the vertical deflection plates to be shorter in length and spaced further apart so that the transient time of the electrons between such vertical deflection plates is shorter, and the capacitance of such plates is reduced thereby increasing the high frequency response of the tube.

The electron mirror 16 is inclined at a slight angle with respect to the plane of the fluorescent screen 16 on the order of about 12 degrees. Also, the axis of the electron gun 18 makes an angle slightly less than 90 degrees with the plane of the electron mirror which may be about 84 degrees to enable such gun to be positioned out of the way of the reflected electron beam and prevents a "shadow" of the gun from being projected on the screen.

Figure 3:
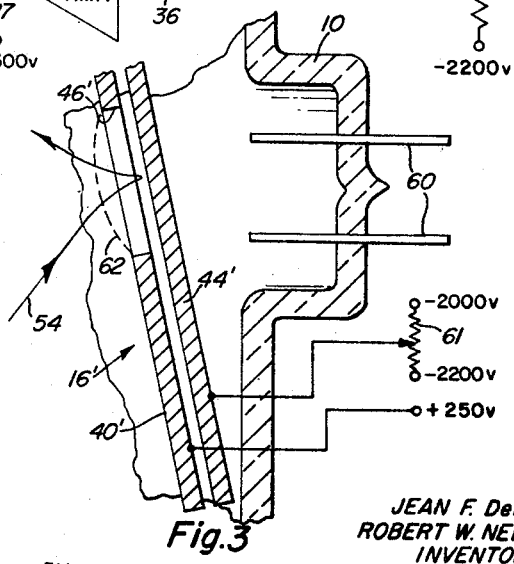
FIG. 3 is an enlarged view of a portion of another cathode ray tube employing a second embodiment of an electron mirror in place of the mirror structure in the tube of FIG. 1.

Another embodiment of the electron mirror structure is shown in FIG. 3 to be formed by only two electrodes. This electron mirror 16' includes an apertured lens electrode 40' and an unapertured backplate or mirror electrode 44'. This embodiment of the electron mirror may be substituted for the three electrode mirror 16 in the cathode ray tube of FIG. 1 but has the disadvantage that it does not operate as effectively as the mirror structure of FIG. 1 in the manner of a "zoom" lens to change the magnification when the potential of the backplate electrode is varied by adjusting the movable contact of a potentiometer 61 connected between —2,000 and —2,200 volts. At the voltages applied to the electrodes 40' and 44', indicated in FIG. 3, the electrical field within the aperture 46' of lens electrode 40' takes the shape of the equipotential surface 62 to magnify the electron image in the manner of a convex lens. When the backplate electrode 44' is made more negative, the planar equipotential reflecting surface adjacent such backplate is moved toward the lens electrode 40' to provide a slight increase in magnification. This also causes the equipotential surface 62 to become more spherical which further increases the magnification, but the overall effect is not as great as in the three element mirror structure.

The deflection sensitivity of the cathode ray tube of FIG. 1 increases as the voltage applied to the mirror electrode decreases to a more negative voltage. For example, in one embodiment, a vertical deflection sensitivity of 14.7 volts per centimeter was obtained when the mirror electrode was connected to −3,200 volts while it changed to 6.6 volts per centimeter when the mirror electrode was connected to a potential of −4,000 volts. At the same time, the spot size of the electron beam image on the fluorescent screen increased from about .04 inch in diameter to .06 inch when the mirror electrode voltage was changed from −3,000 volts to −4,000 volts.

In addition to the open aperture electron mirror structures described, it is also possible to provide similar mirror structures in which metal meshes are provided over the apertures 46 and 48. However, it was found that tubes employing this type of electron mirror had less sensitivity than those shown in FIGS. 1 to 3. In addition, an extremely large increase in deflection sensitivity can be obtained by placing the vertical deflection plates within the mirror structure so that the electron beam is deflected after such beam has been decelerated to substantially zero velocity. Unfortunately, the presence of the deflection plates inside the mirror structure tends to distort the electrostatic field within such mirror structure so that the electron image is distorted. However, since the deflection plates within the mirror structure can be of extremely short length and still provide adequate deflection of the beam, it is possible to provide the deflection plates as conductive coatings on an insulator layer supported on the mirror electrode 44 in which case very little field distortion would result.

It will be obvious to those having ordinary skill in the art that various changes may be made in the details of the above-described preferred embodiments of the present invention without departing from the spirit of the invention. For example, the positions of the horizontal and vertical deflection plates can be reversed, or the connections of the vertical amplifier and the horizontal sweep generator can be reversed. Therefore, the scope of the present invention should only be determined by the following claims.

We claim:

1. In a cathode ray tube employing electron beam deflection, the improvement comprising an electron mirror structure, including:
   a lens electrode having an aperture therethrough;
   a mirror electrode supported in closely spaced insulated relationship with respect to said lens electrode; and
   means for applying different D.C. voltages to said lens electrode and said mirror electrode to form a magnifying electron mirror so that an electron beam entering said mirror structure through said aperture in one direction is reflected and caused to exit said mirror structure in a different direction through the same aperture it entered, and the electron image formed by said beam is magnified by said mirror structure.

2. In a cathode ray tube employing electron beam deflection, the improvement comprising an electron mirror structure, including:
   a first lens electrode having an aperture therethrough;
   a second lens electrode having an aperture therethrough;
   a mirror electrode, said second lens electrode being supported between said first lens electrode and said mirror electrode with said apertures in axial alignment; and
   means for applying different D.C. voltages to said first lens electrode, said second lens electrode, and said mirror electrode to form a magnifying electron mirror so that an electron beam entering said mirror structure through said aperture in said first lens electrode in one direction is reflected and caused to exit said mirror structure through the same aperture it entered, and the electron image formed by said beam is magnified by said mirror structure.

3. In a cathode ray tube employing electron beam deflection, the improvement comprising an electron mirror structure, including:
   a lens electrode having a single circular aperture therethrough;
   an unapertured backplate electrode of homogeneous non-magnetic, electrical conducting material supported in closely spaced insulated relationship with respect to said lens electrode; and
   means for applying a uniform D.C. potential to said backplate electrode which is more negative than that applied to said lens electrode to form a magnifying electron mirror so that an electron beam entering said mirror structure through said aperture in one direction is caused to substantially reverse its direction before striking said backplate electrode and to exit said mirror structure through the same aperture it entered, and the electron image formed by said beam is magnified by said mirror structure.

4. In a cathode ray tube employing electron beam deflection the improvement comprising an electron mirror structure, including:
   a first lens electrode in the form of a substantially flat plate having a single circular aperture therethrough;
   a second lens electrode in the form of a substantially flat plate having a single circular aperture therethrough;
   an unapertured backplate electrode of non-magnetic, electrical conducting material, said second lens electrode being supported between said first lens electrode and said backplate electrode with said apertures in axial alignment; and
   means for applying D.C. voltages to said first lens electrode, said second lens electrode, and said backplate electrode which are successively more negative in the order named to form a magnifying electron mirror so that an electron beam entering said mirror structure through said aperture in said first lens electrode in one direction is caused to substantially reverse its direction before striking said backplate electrode and to exit said mirror structure through the same aperture, and the electron image formed by said beam is magnified by said mirror structure.

5. A cathode ray tube, comprising:
   an evacuated envelope;
   a magnifying electron mirror structure supported within said envelope, said mirror structure including a lens electrode having an aperture therethrough and a mirror electrode of non-magnetic, electrically conductin material mounted in spaced insulated relationship;
   a fluorescent screen mounted within said envelope outside of said mirror structure on the opposite side of said lens electrode from said mirror electrode;
   means including a cathode supported within said envelope between said mirror structure and said fluorescent screen, for producing an electron beam and projecting said beam in one direction into said mirror structure through said aperture in said lens electrode; and
   means for deflecting said electron beam in accordance with an input signal applied to said tube before said beam is transmitted through said mirror structure, to form an electron image of the waveform of said input signal so that said electron image is magnified and projected out of said mirror structure through said aperture and onto said screen in a direction different from said one direction.

6. A cathode ray tube, comprising:
   an evacuated envelope;
   an electron mirror structure supported within said esvelope, said mirror including a pair of first and second lens electrodes each having an aperture therethrough and a backplate electrode of non-magnetic, electrically conducting material successively mounted in spaced insulated relationship in the order named;
   a fluorescent screen mounted within said envelope outside of said mirror structure on the opposite side of said lens electrodes from said backplate electrode;

electron gun means including a cathode supported within said envelope on the same side of said backplate structure as said screen, for producing an electron beam and directing said beam in one direction into said mirror structure through the aperture in said first lens electrode;

deflection means for deflecting said electron beam in accordance with an input signal applied to said deflection means to form an electron image of said signal; and means for applying uniform D.C. voltages to said lens electrodes and said backplate electrode to change the direction of the electron beam within said mirror structure in order to direct such beam out of said mirror structure through said aperture in said first lens electrode, to magnify said electron image and project the magnified electron image in focus onto said fluorescent screen.

7. A cathode ray tube, comprising:

an evacuated envelope;

an electron mirror structure supported within said envelope, said mirror including a pair of first and second lens electrodes each in the form of a flat plate having a circular aperture therethrough, and a backplate electrode in the form of an unapertured flat plate of non-magnetic, electrically conducting material, successively mounted in spaced insulated relationship in the order named;

a fluorescent screen mounted within said envelope outside of said mirror structure on the opposite side of said lens electrodes from said backplate electrode;

electron gun means including a cathode supported within said envelope on the same side of said mirror structure as said screen, for producing an electron beam and directing said beam in one direction into said mirror structure through the aperture in said first lens electrode;

deflection means for deflecting said electron beam in accordance with an input signal applied to said tube to form an electron image of said signal; and means for applying D.C. voltages to said lens electrodes, said backplate electrode and said cathode so that said first lens electrode is at a more positive voltage than said cathode and said second lens electrode and said backplate electrode are at a more negative voltage than said cathode to change the direction of the electron beam within said mirror structure in order to direct such beam out of the mirror structure through said aperture in said first lens electrode, to magnify said electron image and to project the magnified electron image in focus onto said fluorescent screen, and for varying the voltage on said backplate electrode to change the magnification of the electron image.

8. A cathode ray tube comprising:

an evacuated envelope;

an electron mirror structure supported within said envelope, said mirror including a pair of first and second lens electrodes each having a circular aperture therethrough and an unapertured backplate electrode of homogeneous non-magnetic, electrically conducting material successively mounted in spaced insulated relationship in the order named;

a fluorescent screen mounted within said envelope outside of said mirror structure on the opposite side of said lens electrodes from said backplate electrode;

electron gun means including a cathode supported within said envelope on the same side of said mirror structure as said screen, for producing an electron beam and directing said beam in one direction into said mirror structure through the aperture in said first lens electrode;

deflection means for deflecting said electron beam in accordance with an input signal applied to said tube to form an electron image of said signal;

shield means positioned between said electron gun means and the path of the electron beam traveling from said mirror structure to said screen to shield said path from the electrical field of said gun means; and means for applying D.C. voltages to said lens electrodes, said mirror electrode and said cathode so that said first lens electrode is at a more positive voltage than said cathode and said second lens electrode and said backplate electrode are at a more negative voltage than said cathode to change the direction of the electron beam within said mirror structure in order to direct such beam out of said mirror structure through said aperture in said first lens electrode, to magnify said electron image and to project the magnified electron image in focus onto said fluorescent screen, and for varying the voltage on said backplate electrode to change the magnification of the electron image formed by said beam with said mirror structure.

References Cited

UNITED STATES PATENTS

| | | | |
|---|---|---|---|
| 2,161,466 | 6/1939 | Henneberg | 313—80 |
| 2,999,957 | 9/1961 | Schagen et al. | |
| 3,080,500 | 3/1963 | Preston | 313—80 |
| 3,124,790 | 3/1964 | Kuehler | 340—174.1 |

RODNEY D. BENNETT, *Primary Examiner.*

J. G. BAXTER, *Assistant Examiner.*